(12) United States Patent
Abedini et al.

(10) Patent No.: US 10,630,524 B2
(45) Date of Patent: Apr. 21, 2020

(54) EARLY DETERMINATION OF AN OPERATION MODE IN A NARROWBAND INTERNET OF THINGS (NB-IOT) SYSTEM

(71) Applicant: QUALCOMM Incorporated, San Diego, CA (US)

(72) Inventors: Navid Abedini, Raritan, NJ (US); Chun-Hao Hsu, San Jose, CA (US); Wing Ip Tam, Marlboro, NJ (US); Sathyadev Venkata Uppala, Whitehouse Station, NJ (US); Amit Mathur, Morganville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,969

(22) Filed: Sep. 19, 2017

(65) Prior Publication Data
US 2019/0089568 A1    Mar. 21, 2019

(51) Int. Cl.
| | |
|---|---|
| H04W 72/04 | (2009.01) |
| H04L 27/26 | (2006.01) |
| H04W 56/00 | (2009.01) |
| H04W 4/70 | (2018.01) |
| H04L 5/00 | (2006.01) |

(52) U.S. Cl.
CPC .......... *H04L 27/2655* (2013.01); *H04L 5/003* (2013.01); *H04L 27/2613* (2013.01); *H04L 27/2676* (2013.01); *H04W 4/70* (2018.02); *H04W 56/001* (2013.01); *H04W 72/0406* (2013.01); *H04L 5/001* (2013.01); *H04L 5/005* (2013.01); *H04L 5/0035* (2013.01); *H04L 5/0044* (2013.01); *H04L 27/2611* (2013.01); *H04L 27/2657* (2013.01)

(58) Field of Classification Search
CPC combination set(s) only.
See application file for complete search history.

(56) References Cited

U.S. PATENT DOCUMENTS

| | | | |
|---|---|---|---|
| 2017/0093540 A1 | 3/2017 | Lei et al. | |
| 2018/0041976 A1* | 2/2018 | Chang | H04W 56/001 |
| 2018/0048444 A1* | 2/2018 | Park | H04L 5/005 |
| 2018/0054340 A1* | 2/2018 | Rico Alvarino | H04W 4/70 |

(Continued)

FOREIGN PATENT DOCUMENTS

| | | |
|---|---|---|
| WO | WO-2017043878 A1 | 3/2017 |
| WO | WO-2017052326 A1 | 3/2017 |
| WO | WO-2017078802 A1 | 5/2017 |

OTHER PUBLICATIONS

Wang Y.P.E., et al., "A Primer on 3GPP Narrowband Internet of Things (NB-IoT)", Jun. 2016, pp. 1-8.

*Primary Examiner* — Lakeram Jangbahadur
(74) *Attorney, Agent, or Firm* — Patterson & Sheridan, L.L.P.

(57) ABSTRACT

Methods and apparatus for early determination of an operation mode in a Narrowband Internet of Things (NB-IoT) system are provided. A User Equipment (UE) determines a mode of operation of a NB-IoT network before decoding a broadcast channel which indicates the mode of operation, based on at least one synchronization signal received at the UE, wherein the mode of operation indicates what bandwidth resources are used in the network. The UE processes signals based on the determined mode of operation.

25 Claims, 9 Drawing Sheets

(56) References Cited

U.S. PATENT DOCUMENTS

2018/0097596 A1\* 4/2018 Palanivelu ............ H04L 5/0005
2018/0184410 A1\* 6/2018 John Wilson ......... H04L 5/0048
2018/0227897 A1\* 8/2018 Yeo ....................... H04W 84/04
2018/0287845 A1 10/2018 Kim et al.

\* cited by examiner

EARLY DETERMINATION OF AN OPERATION MODE IN A NARROWBAND INTERNET OF THINGS (NB-IOT) SYSTEM

FIELD

The present disclosure relates generally to wireless communication systems, and more particularly, to methods and apparatus for early determination of an operation mode in a Narrowband Internet of Things (NB-IoT) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a User Equipment (UE). The method generally includes determining a mode of operation of a Narrowband Internet of Things (NB-IoT) network based on at least one synchronization signal received at the UE, wherein the mode of operation indicates what bandwidth resources are used in the network, and processing signals based on the determined mode of operation.

Certain aspects of the present disclosure provide an apparatus for wireless communication by a UE. The apparatus generally includes means for determining a mode of operation of a Narrowband Internet of Things (NB-IoT) network, based on at least one synchronization signal received at the UE, wherein the mode of operation indicates what bandwidth resources are used in the network, and means for processing signals based on the determined mode of operation.

Certain aspects of the present disclosure provide an apparatus for wireless communication by a UE. The apparatus generally includes at least one processor and a memory coupled to the at least one processor. The at least one processor is generally configured to determine a mode of operation of a Narrowband Internet of Things (NB-IoT) network, based on at least one synchronization signal received at the UE, wherein the mode of operation indicates what bandwidth resources are used in the network, and process signals based on the determined mode of operation.

Certain aspects of the present disclosure provide a computer-readable medium for wireless communication by a UE. The computer-readable medium generally includes code for determining a mode of operation of a Narrowband Internet of Things (NB-IoT) network, based on at least one synchronization signal received at the UE, wherein the mode of operation indicates what bandwidth resources are used in the network, and processing signals based on the determined mode of operation.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
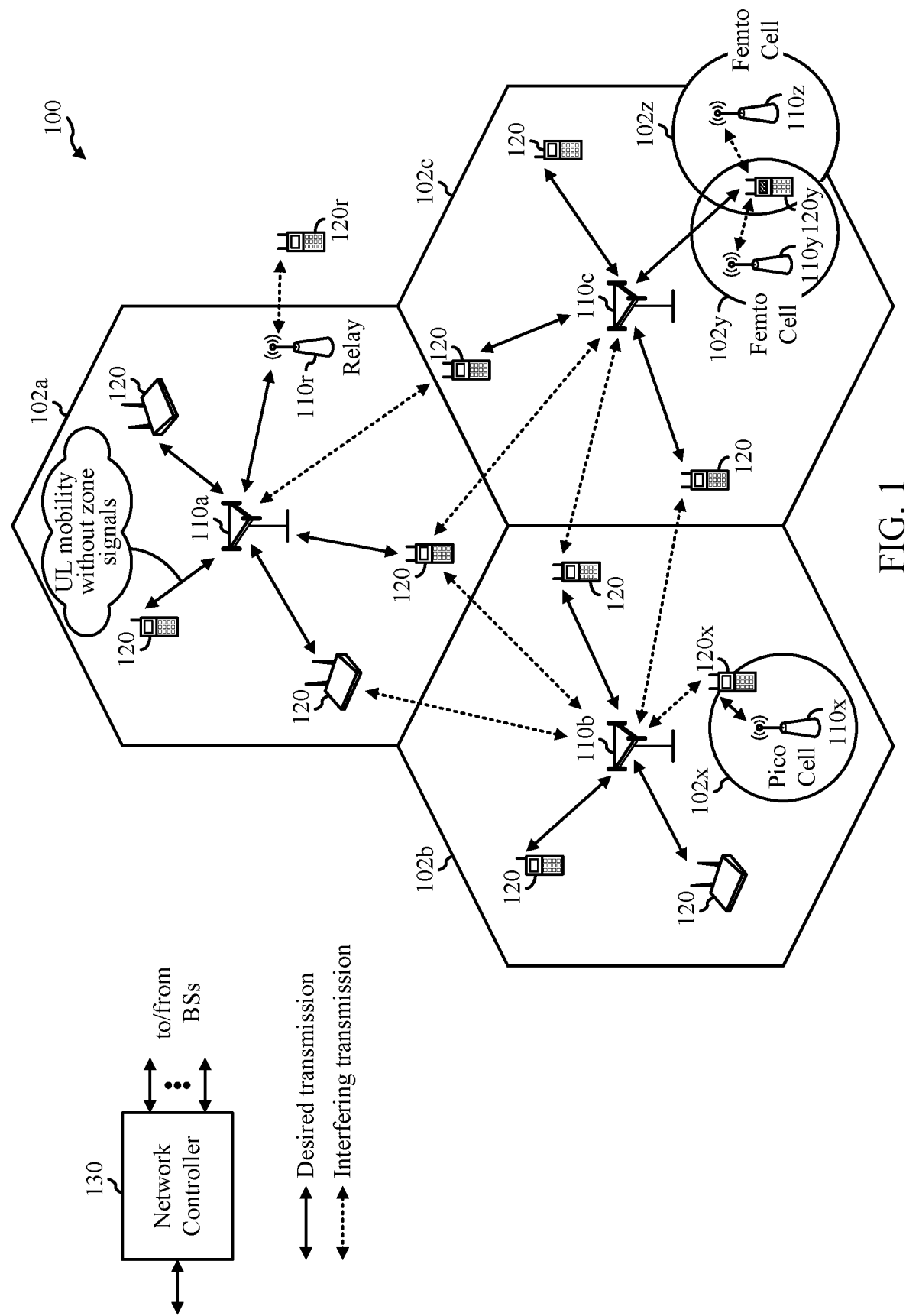
FIG. 1 is a block diagram conceptually illustrating an example telecommunications system, in accordance with certain aspects of the present disclosure.

In certain aspects, certain important system configurations in an Narrowband Internet of Things (NB-IoT) network are determined based on the operation mode being used in the network. For example, a configuration of the Narrow-Band Reference Signal (NRS) is determined based on the NB-IoT mode of operation being used in the NB-IoT network. In an aspect, when the UE receives information (e.g., as part of NPBCH) indicating the mode being used in the NB-IoT network is Guard-band mode or Stand-alone mode of operation, the UE (e.g., before receiving the parameter SystemInformationBlockType1-NB from the network), may assume that the NRS is transmitted at least in subframes 0, 1, 3, 4, and in subframe 9 that does not include Narrow-Band Secondary Synchronization Signal (NSSS). On the other hand, if the information indicates an In-band mode of operation, the UE (e.g., before receiving the parameter SystemInformationBlockType1-NB from the network) may assume that the NRS is transmitted at least in subframes 0, 4, and in subframe 9 that does not include NSSS.

In another example, a channel raster frequency offset is determined based on the NB-IoT mode of operation being used in the network. For example, the stand-alone mode has a 0 raster frequency offset. On the other hand, for guard-band or in-band modes, the raster frequency offset is –/+2.5 KHz or –/+7.5 KHz. The channel raster frequency offset is generally an offset between the center frequency of an NB-IoT frequency band and a frequency raster location.

In certain aspects, having knowledge about the NB-IoT operation mode, before decoding NPBCH may be beneficial for decoding NPBCH. For example, in guard-band and/or stand-alone modes the UE may use the extra NRS signals transmitted in subframes 1 and 3, in addition to the NRS signals in subframes 0, 4, and 9 for better channel estimation for NPBCH decoding. Further, in the stand-alone mode of operation, since there is no raster frequency offset, the estimated frequency offset using NPSS (Narrow Band Primary Synchronization Signal) and/or NSSS (Narrow Band Secondary Synchronization Signal) is the actual oscillator frequency offset and may be used to adjust the sample timing, for example, on other frequency bands.

Certain aspects of the present disclosure discuss techniques for a UE to determine a mode of operation of an NB-IoT network before decoding NPBCH which generally carries an indication of the operation mode of the NB-IoT network. For example, the techniques may include determining the NB-IoT mode of operation based on at least one synchronization signal (e.g., NPSS and/or NSSS) received in one or more NB-IoT frequency bands.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a healthcare device, a wearable device such as a smart watch, smart clothing, smart glasses, virtual reality googles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a positioning device (e.g., GPS, Beidou, Galileo, GLONASS, terrestrial), or any other suitable device that is configured to communicate via a wireless or wired medium. Some UEs may be considered machine-type communication (MTC) devices or enhanced or evolved MTC (eMTC) devices. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Machine-type communication UEs or Internet of Things (IoT) UEs include, for example, robots, drones, remote devices, sensors, meters, monitors, location tags, etc., that may communicate with a BS, another device (e.g., remote device), or some other entity. Some UEs may be implemented as NB-IoT devices. A wireless node may provide, for example, connectivity for or to a network (e.g., a wide area network such as Internet or a cellular network) via a wired or wireless communication link. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
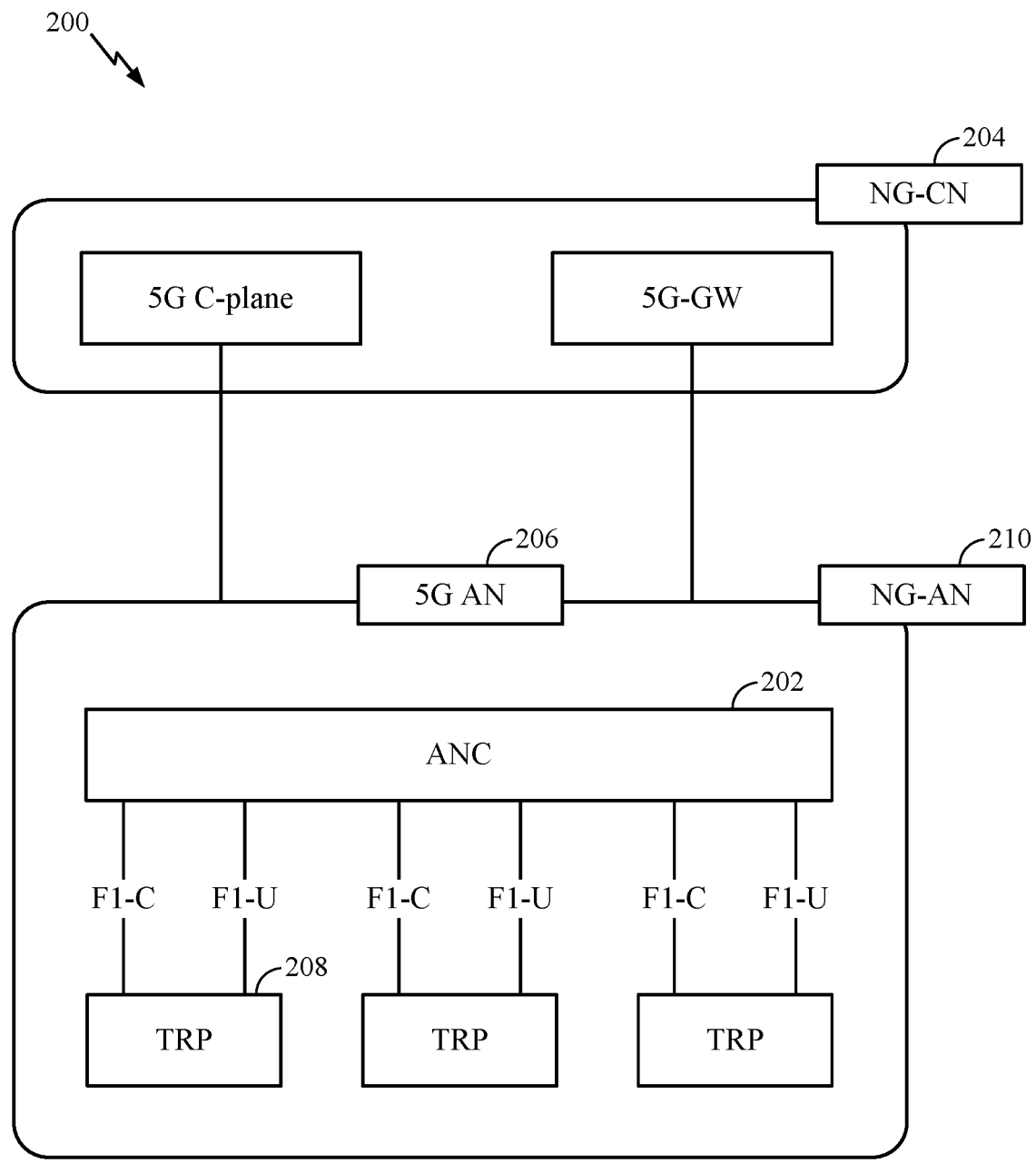
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
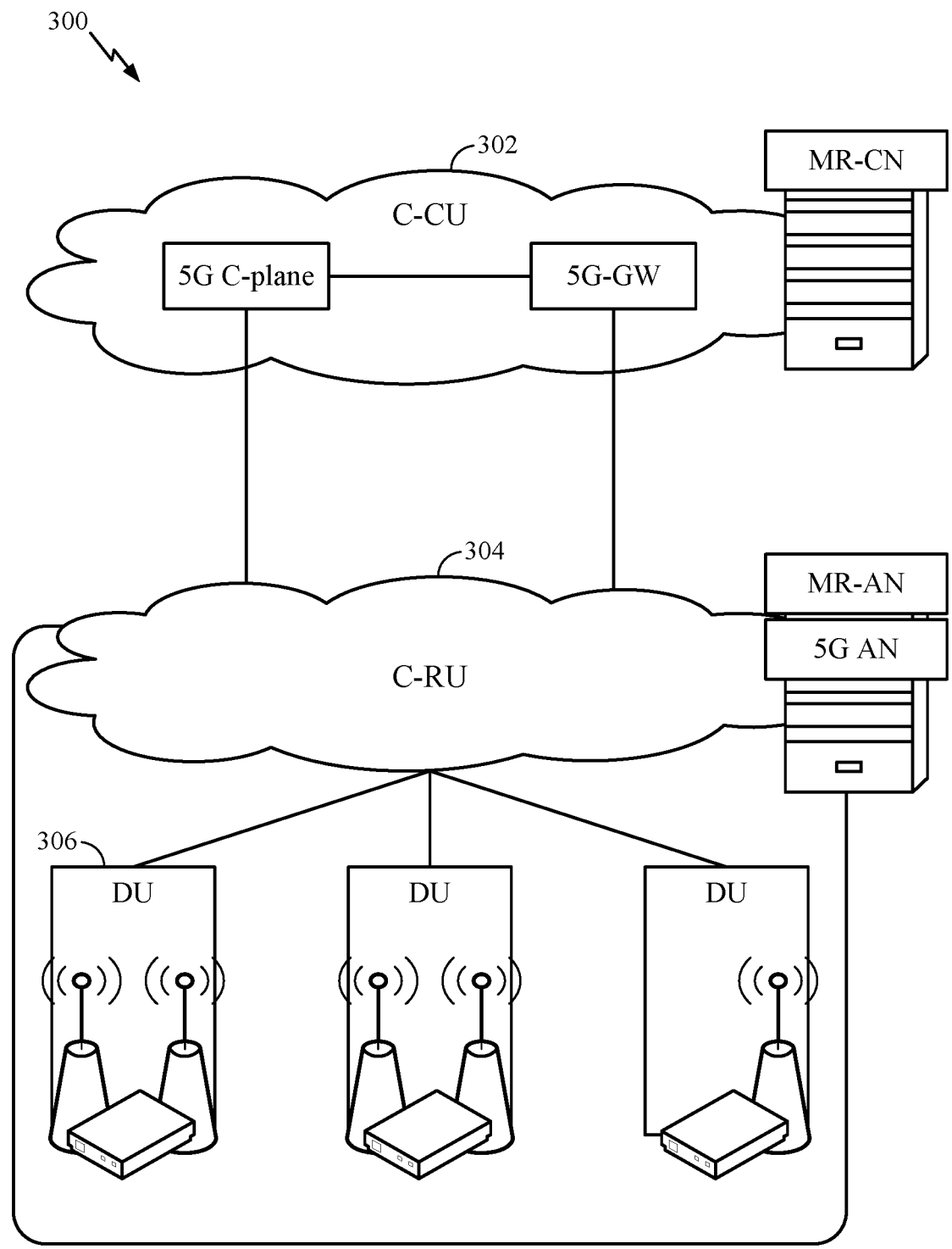
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
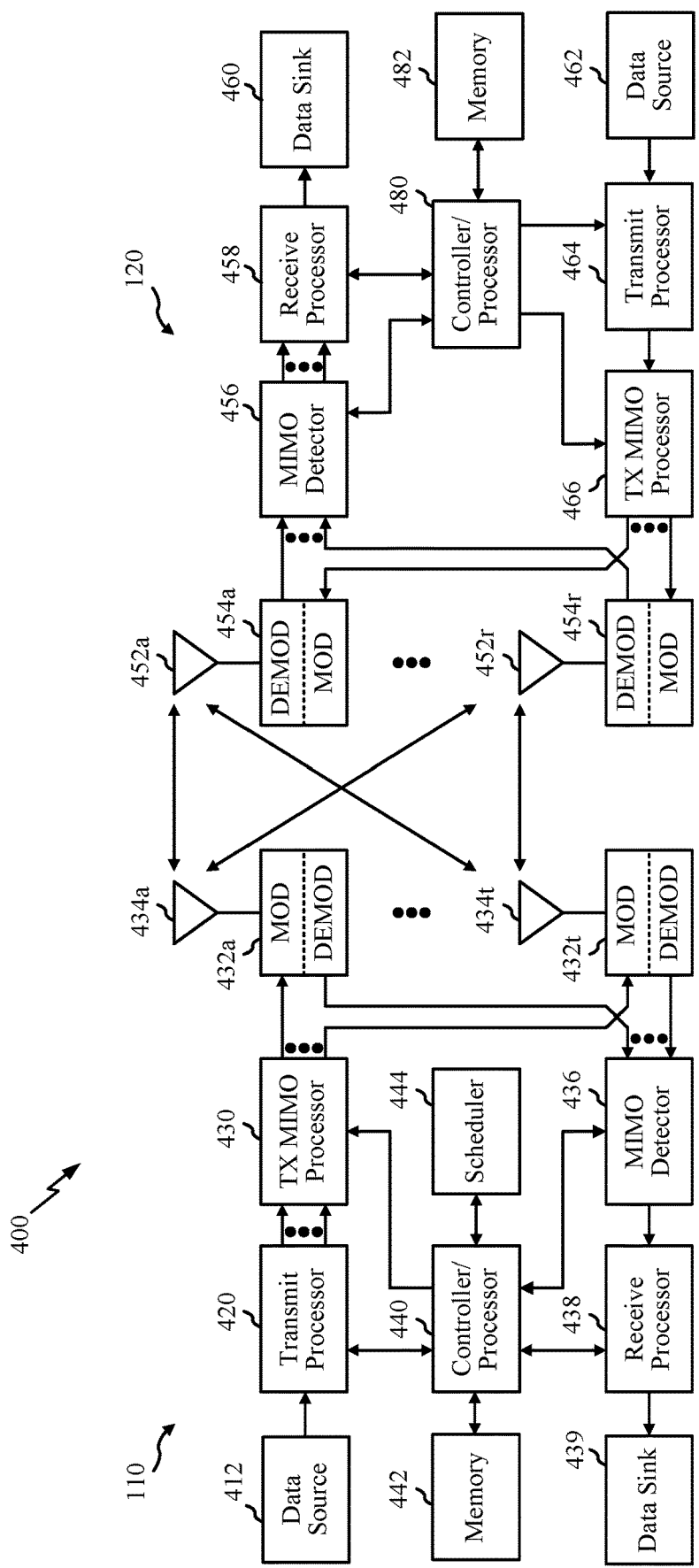
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 9.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct operations for the techniques described herein. The processor 480 and/or other processors and modules at the UE 120 may also perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
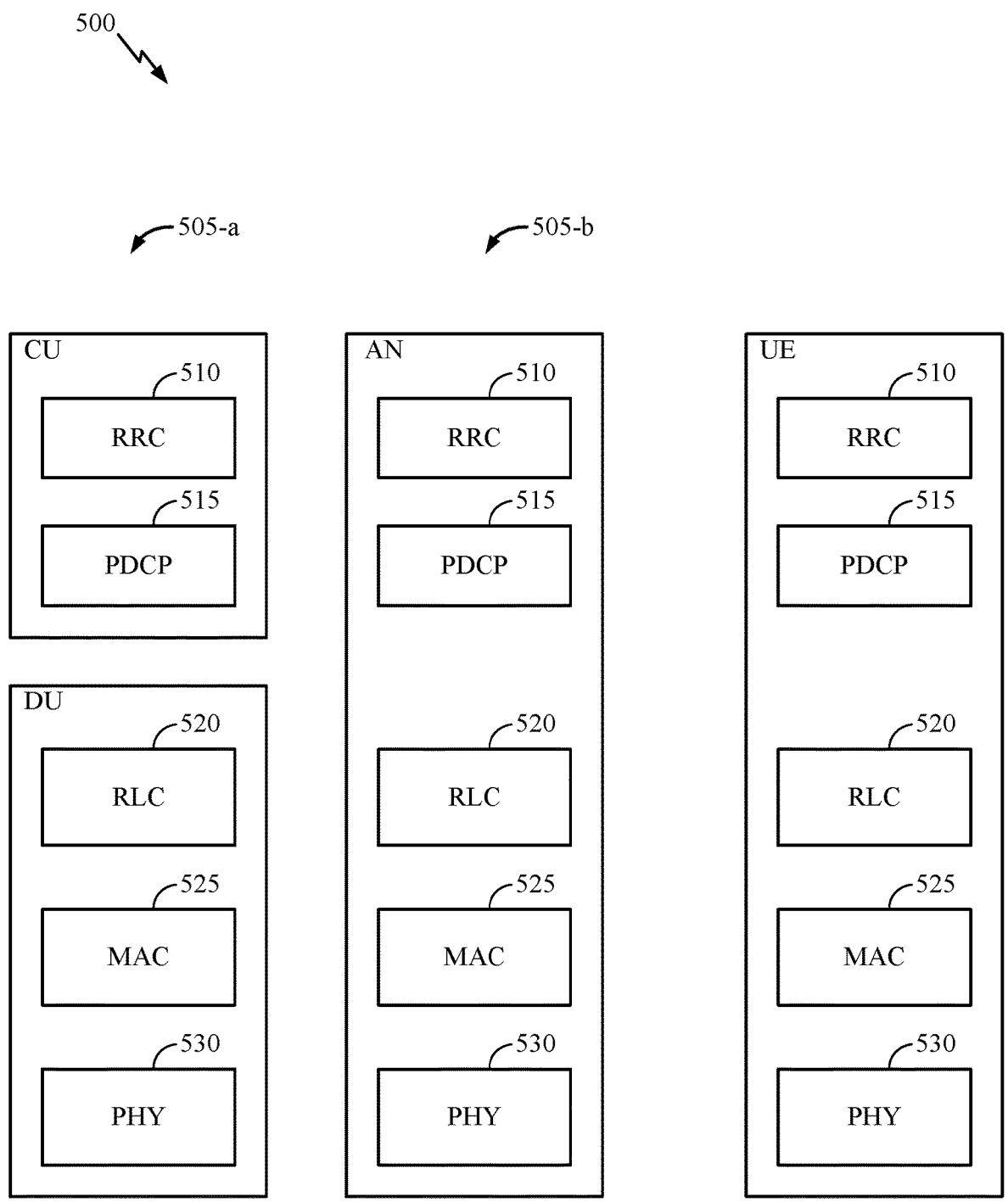
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
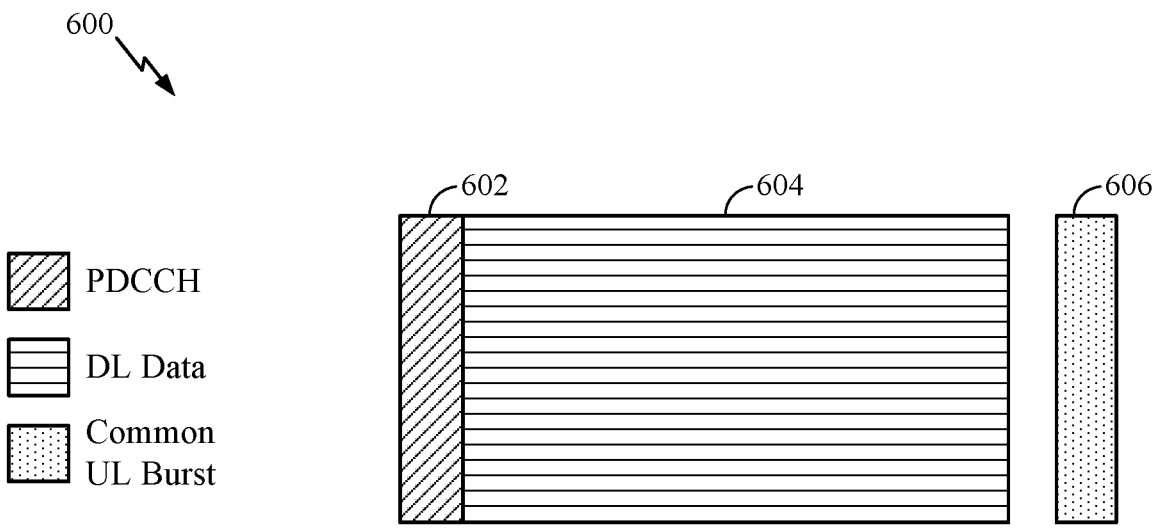
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
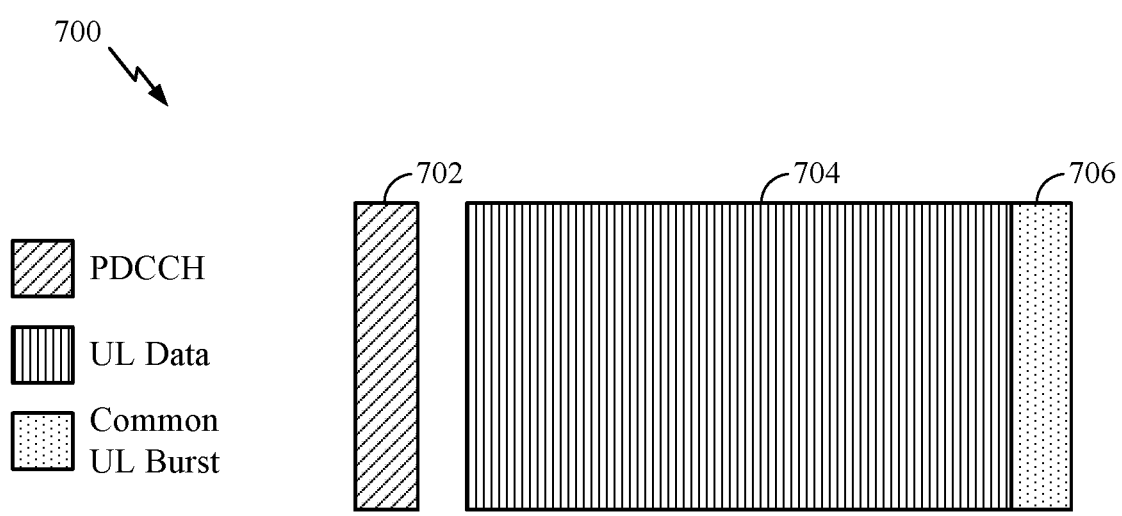
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Narrow Band Internet of Things (NB IoT)

The Internet of Things (IoT) is a network of physical objects or "things" embedded with, e.g., electronics, software, sensors, and network connectivity, which enable these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Narrowband IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices.

In NB-IoT systems, devices may communicate using relative narrowband regions of system bandwidth. To reduce the complexity of UEs, NB-IoT may allow for deployments utilizing one Physical Resource Block (PRB) (180 kHZ+20 kHZ guard band). NB-IoT deployments may utilize higher layer components of LTE and hardware to allow for reduced fragmentation and cross compatibility with, for example, NB-LTE and eMTC (enhanced or evolved Machine Type Communications).

The NB-IoT technology may be deployed "in-band", utilizing resource blocks within, e.g., a normal LTE or GSM spectrum. In addition, NB-IoT may be deployed in the unused resource blocks within a LTE carrier's guard-band, or "standalone" for deployments in dedicated spectrum.

Figure 8:
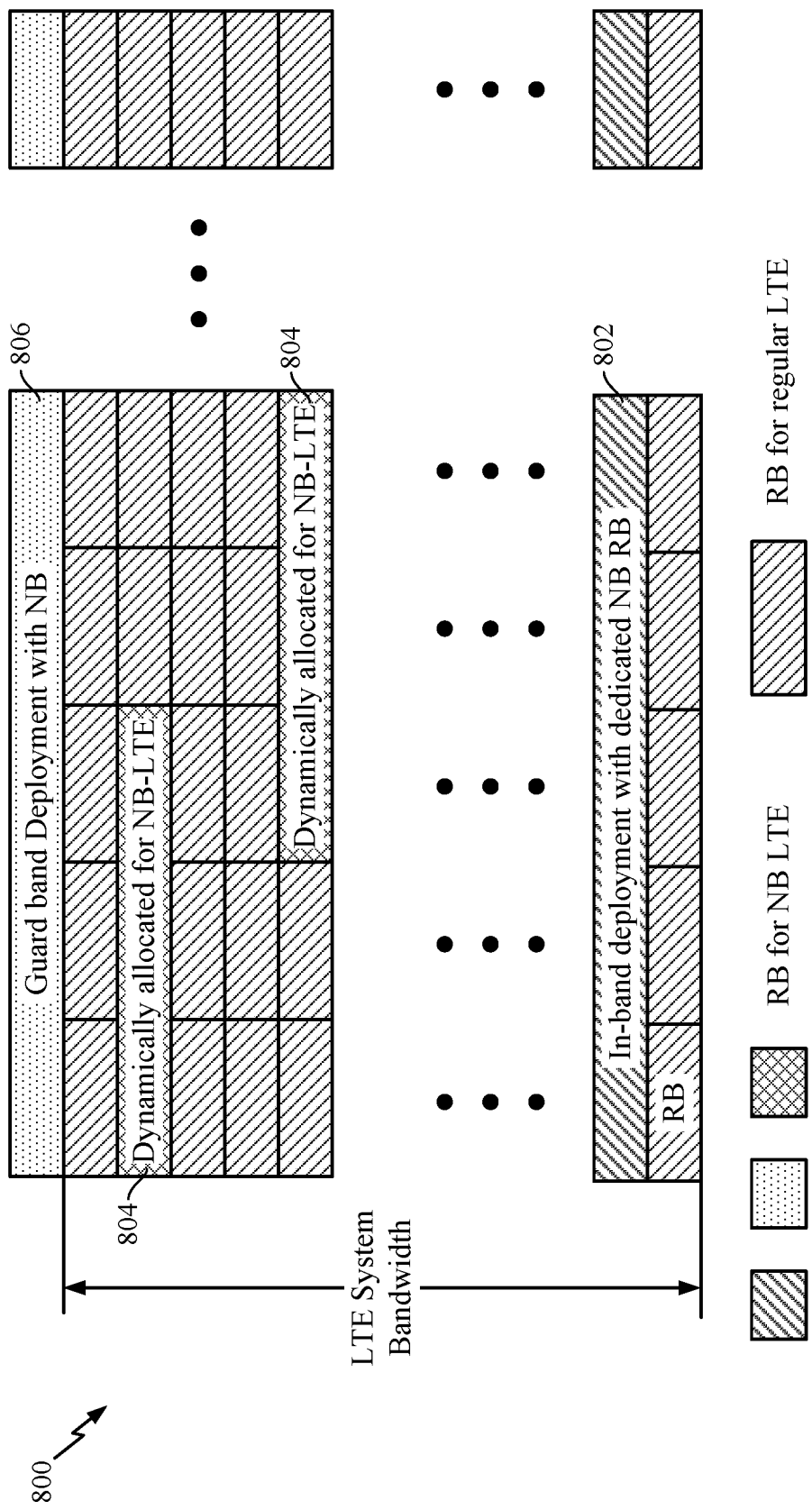
FIG. 8 illustrates an example deployment 800 of NB-IoT, according to certain aspects of the present disclosure.

FIG. 8 illustrates an example deployment 800 of NB-IoT, according to certain aspects of the present disclosure. As noted above, NB-IoT may be deployed in three broad configurations. In one configuration, NB-IoT may be deployed in-band and coexist with legacy GSM/WCDMA/LTE system(s) deployed in the same frequency band. Wideband LTE channel, for example, may be deployed in, e.g., various bandwidths between 1.4 MHz to 20 MHz, and there may be a dedicated RB 802 available for use by NB-IoT, or the RBs allocated for NB-IoT may be dynamically allocated 804. In an in-band deployment, one resource block (RB), or 200 kHz, of a wideband LTE channel may be used for NB-IoT. LTE implementations may include unused portions of radio spectrum between carriers to guard against interference between adjacent carriers. In some deployments, NB-IoT may be deployed in a guard band 806 of the wideband LTE channel. In other deployments, NB-IoT may be deployed standalone (not shown). In a standalone deployment, one 200 MHz carrier may be utilized to carry NB-IoT traffic and GSM spectrum may be reused.

Deployments of NB-IoT, may include synchronization signals such as PSS (e.g., NPSS) for frequency and timing synchronization and SSS (e.g., NSSS) to convey system information. According to certain aspects of the present disclosure, synchronization signals of NB-IoT operations occupy narrow channel bandwidths and can coexist with legacy GSM/WCDMA/LTE system(s) deployed in the same frequency band. NB-IoT operations may include PSS/SSS timing boundaries. In certain aspects, these timing boundaries may be extended as compared to the existing PSS/SSS frame boundaries in legacy LTE systems (e.g., 10 ms) to, for example, 40 ms. Based on the timing boundary, a UE is able to receive a PBCH transmission, which may be transmitted in subframe 0 of a radio frame.

Example Early Determination of an Operation Mode in a Narrow Band Internet of Things (ND-IoT) System Narrowband Internet of Things (NB-IoT) is an LTE Release 13 feature targeting the tracking device, smart home and smart city markets with objectives including low cost, long battery life, and wide coverage, for example, including target objects that are buried deep underground. As noted above, NB-IoT generally operates in three operation modes, namely Stand-alone, Guard-band, and In-band modes of NB-IoT operation. An indication of the operation mode is generally carried by the Master Information Block (MIB) in the Narrow-Band Physical Broadcast Channel (NPBCH).

In certain aspects, certain important system configurations in an NB-IoT network are determined based on the operation mode being used in the network. For example, a configuration of the Narrow-Band Reference Signal (NRS) is determined based on the NB-IoT mode of operation being used in the NB-IoT network. In an aspect, when the UE receives information (e.g., as part of NPBCH) indicating the mode being used in the NB-IoT network is Guard-band mode or Stand-alone mode of operation, the UE (e.g., before receiving the parameter SystemInformationBlockType1-NB from the network), may assume that the NRS is transmitted at least in subframes 0, 1, 3, 4, and in subframe 9 that does not include Narrow-Band Secondary Synchronization Signal (NSSS). On the other hand, if the information indicates an In-band mode of operation, the UE (e.g., before receiving the parameter SystemInformationBlockType1-NB from the network) may assume that the NRS is transmitted at least in subframes 0, 4, and in subframe 9 that does not include NSSS.

In another example, a channel raster frequency offset is determined based on the NB-IoT mode of operation being used in the network. For example, the stand-alone mode has a 0 raster frequency offset. On the other hand, for guard-band or in-band modes, the raster frequency offset is −/+2.5 KHz or −/+7.5 KHz. The channel raster frequency offset is generally an offset between the center frequency of an NB-IoT frequency band and a frequency raster location.

In certain aspects, having knowledge about the NB-IoT operation mode, before decoding NPBCH may be beneficial for decoding NPBCH. For example, in guard-band and/or stand-alone modes the UE may use the extra NRS signals transmitted in subframes 1 and 3, in addition to the NRS signals in subframes 0, 4, and 9 for better channel estimation for NPBCH decoding. Further, in the stand-alone mode of operation, since there is no raster frequency offset, the estimated frequency offset using NPSS (Narrow Band Primary Synchronization Signal) and/or NSSS (Narrow Band Secondary Synchronization Signal) is the actual oscillator frequency offset and may be used to adjust the sample timing, for example on other frequency bands.

Certain aspects of the present disclosure discuss techniques for a UE to determine a mode of operation of an NB-IoT network before decoding NPBCH which generally carries an indication of the operation mode of the NB-IoT network. For example, the techniques may include determining the NB-IoT mode of operation based on at least one synchronization signal (e.g., NPSS and/or NSSS) received in one or more NB-IoT frequency bands.

Figure 9:
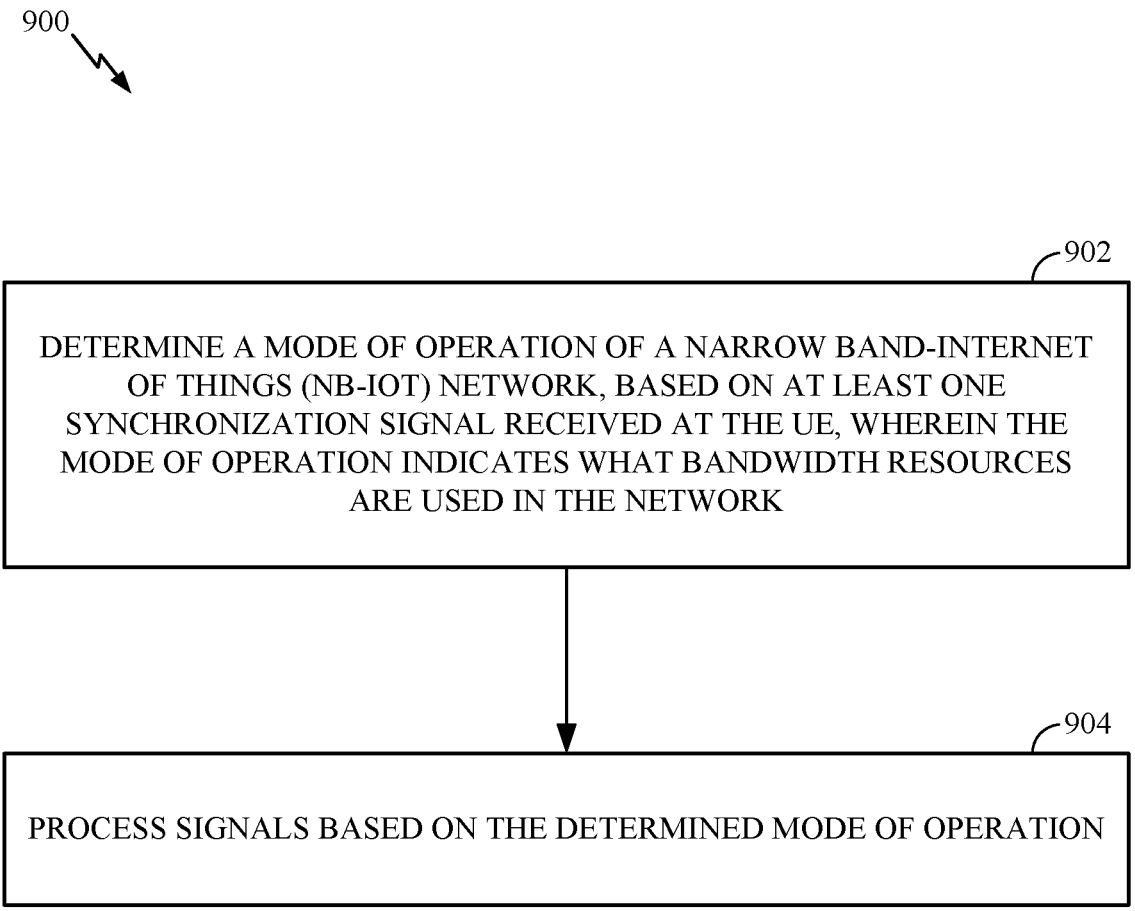
FIG. 9 illustrates example operations 900, performed by a UE, for determining an operation mode of a NB-IoT network before decoding a broadcast channel carrying the operation mode, in accordance with certain aspects of the present disclosure.

FIG. 9 illustrates example operations 900, e.g., performed by a UE, for determining an operation mode of a NB-IoT network before decoding a broadcast channel carrying the operation mode, in accordance with certain aspects of the present disclosure. Operations 900 begin, at 902 by determining a mode of operation of the NB-IoT network (e.g., before decoding a broadcast channel which indicates the mode of operation) based on at least one synchronization signal received at the UE, wherein the mode of operation indicates what bandwidth resources are used in the network. At 904, the UE processes signals based on the determined mode of operation.

In certain aspects, the UE may determine the mode of operation based on whether resources used for transmitting at least one synchronization signal (e.g., NPSS and/or NSSS) are punctured in a subset of resources (e.g., resource elements). In certain aspects, for the in-band operation mode, the transmitted NPSS and/or NSSS signals are punctured on a subset of resources (e.g., resource elements) that overlap with resources (e.g., resource elements) used for transmission of CRS (Cell-Specific Reference Signals). In an aspect, CRS resource configuration depends on the number of CRS ports used (e.g., indicated by the numberCRSports parameter) and also the cell id. In certain aspects, during the detection of NPSS and/or NSSS, if it is determined that the transmitted NPSS and/or NSSS signal is punctured, the UE may determine that the mode of operation is an in-band mode. On the other hand, if the synchronization signals are not punctured, the UE may determine that the mode of operation is at least one of the standalone mode or guard-band mode.

Figure 10:
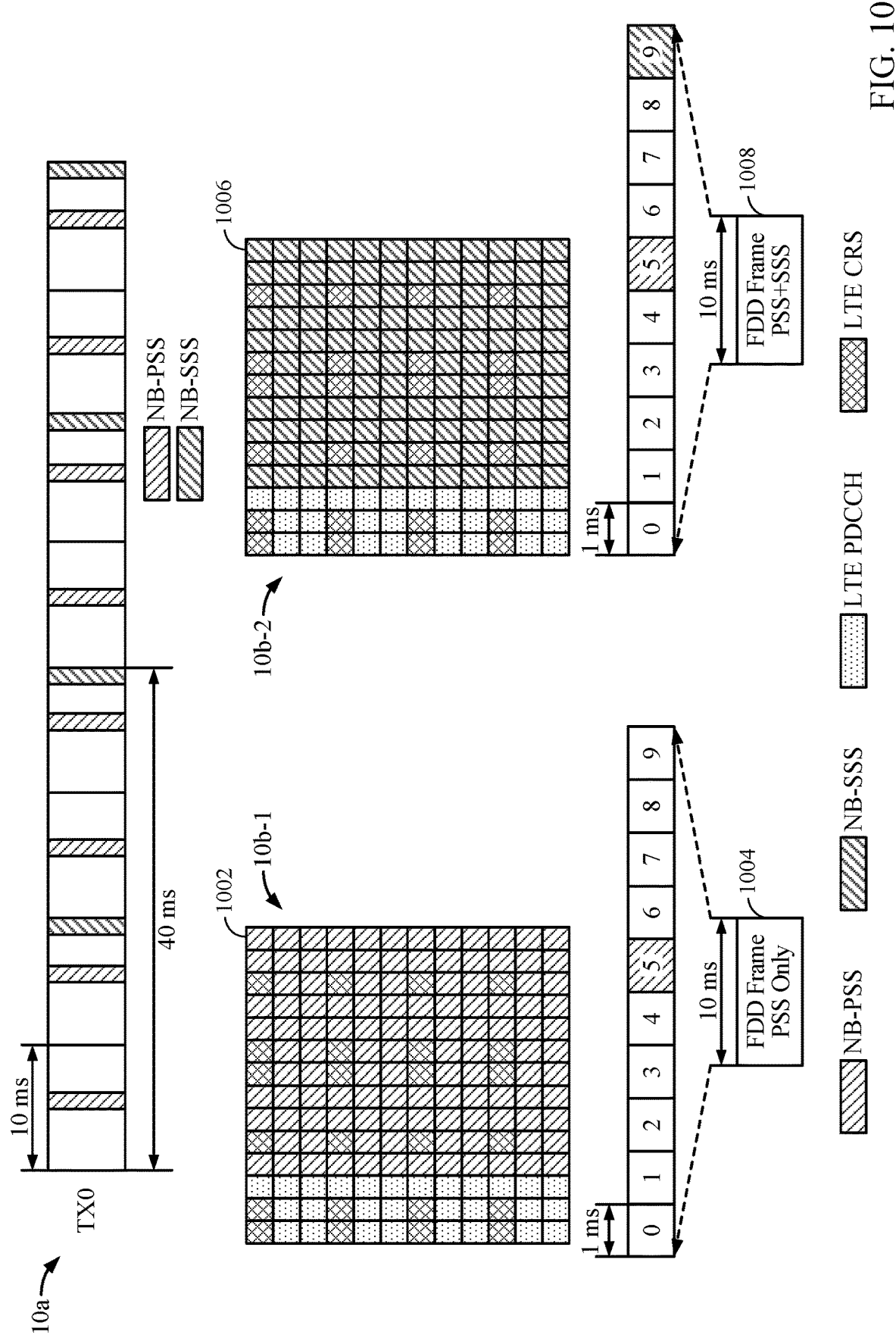
FIG. 10 illustrates resource example allocation for NPSS/NSSS and example puncturing of the NPSS/NSSS resources for NB-IoT in-band operation, in accordance with certain aspects of the present disclosure.

FIG. 10 illustrates resource example allocation for NPSS/NSSS and example puncturing of the NPSS/NSSS resources for NB-IoT in-band operation, in accordance with certain aspects of the present disclosure.

10*a* illustrates resource allocation for NB-PSS (or NPSS) and NB-SSS (or NSSS) over a plurality of LTE frames. 10*a* shows eight consecutive 10 ms LTE frames with NPSS allocated in every frame and NSSS allocated in every other frame.

10*b*-1 illustrates NPSS resources punctured by CRS transmissions. As shown in 10*b*-1, NPSS is transmitted in subframe 5 of the FDD frame 1004 that includes PSS allocation only. Resource block 1002 is a resource block allocated in subframe 5, and includes resource elements allocated for LTE PDCCH, NPSSS and LTE CRS. As shown, certain resource elements in the NPSS allocation region are punctured with LTE CRS.

10*b*-2 illustrates NSSS resources punctured by CRS transmissions. As shown in 10*b*-2, FDD frame 1008 includes both NPSS and NSS allocation. NPSS is transmitted in subframe 5 of the FDD frame 1008 and NSSS is transmitted in subframe 9 of the FDD frame 1008. Resource block 1006 is a resource block allocated in subframe 9, and includes resource elements allocated for LTE PDCCH, NSSSS and LTE CRS. As shown, certain resource elements in the NSSS allocation region are punctured with LTE CRS.

In certain aspects, for determining whether or not the received NPSS/NSSS is punctured, the UE may extract the NPSS/NSSS from a signal received on a NB-IoT frequency band and then correlate the extracted signal with each of a plurality of candidate resource patterns including a non-punctured resource pattern and at least one punctured resource pattern. The UE may determine whether or not the resources used for transmitting the NPSS/NSSS are punctured based on a result of the correlation.

In certain aspects each candidate punctured resource pattern corresponds to a different possible hypothesis for a punctured resource pattern which is based on a different combination of Narrow Band Cell Identifier (NCell ID) and a number of CRS ports. As noted above, the CRS resource pattern depends on the NCell ID and the number of CRS ports. And thus, a puncturing pattern based on a particular CRS resource pattern depends the NCell ID and the number of CRS ports.

In an example technique, the NB-IoT mode of operation may be determined based on determining whether or not a NSSS transmission is punctured by CRS transmission. In an aspect, after acquiring symbol timing and synchronization using NPSS, a UE may extract a received signal on resource elements corresponding to NSSS. The UE may then compare the extracted signal corresponding to NSSS with a number of candidate resource patterns including one or more candidate punctured resource patterns and a non-punctured resource pattern. In an aspect, each candidate resource pattern is a unique combination of NCell ID of the transmitting cell, subframe timing (SF timing), and number of CRS ports (numberCRSports) used for CRS transmission. Thus, each candidate resource pattern may be represented by (NCell ID, SF timing, numberCRSports). Generally, the SF timing remains constant across the candidates and may be obtained by decoding NPSS.

In the in-band scenario, for each NCell ID (e.g., corresponding to a transmitting cell), a subset of resource elements is punctured based on the number of CRS ports. The number of CRS ports may be 1, 2 or 4 which is unknown to the UE at this stage. Thus, for a given NCell ID and subframe timing, there may be three possible hypotheses and three corresponding candidate punctured CRS patterns, one punctured pattern for each possible number of the CRS ports. The three candidate punctured CRS patterns may be represented as (NCell ID, SF timing, 4), (NCell ID, SF timing, 2), and (NCell ID, SF timing, 1). In addition, there may be one non-punctured candidate resource pattern corresponding to the number of CRS ports having a value of 0, which may be represented by (NCell ID, SF timing, 0). In an aspect, the extracted NSSS signal is correlated (e.g., using a correlation block at the UE) with each of the candidate punctured patterns and the non-punctured patterns. An NSSS correlation metric is calculated for each candidate. In an aspect, for each candidate the samples corresponding to the punctured resource elements are removed for the calculation of the correlation metric.

In an aspect, a best or a set of best candidate resource patterns (e.g., candidates corresponding to the maximum correlation values) are determined based on the calculated NSSS correlation metric. For each of the surviving candidates (NCell ID, SF timing, numberCRSports), the operation mode is determined. For example, if the result of the correlation includes a punctured resource pattern, the UE may determine the NB-IoT mode as the in-band mode. On the other hand, if the result of the correlation block includes a non-punctured resource pattern, the UE may determine the NB-IoT mode as one of the standalone mode or guard-band mode of operation. In addition, the UE may determine the number of CRS ports corresponding to the punctured resource pattern as the number of CRS ports used for transmitting the signal.

In certain aspects, similar to the above example technique for determining whether or not and NSSS transmission is punctured, the UE may determine whether or not an NPSS transmission is punctured, and determine the NB-IoT mode based on the this determination. In an aspect, NPSS may be detected first based on the assumption that numberCRSports=0, and then refined/re-processed to find a better hypothesis for number of CRS ports. Further, in an aspect, the NB-IoT mode may be determined based on joint processing of NPSS and NSSS to determine whether or not the NPSS-NSSS signals are punctured by CRS transmission.

In certain aspect, the UE may detect the NB-IoT mode based on detecting NPSS/NSSS on a plurality of frequency bands. In certain aspects, the UE may determine the mode of operation based on the relative distance in frequency between detected NB-IoT frequency bands. In an aspect, the UE may examine the frequency separations of the these frequency bands, and if the frequency separations of a subset of the bands are less than a threshold, may determine the operation mode is the standalone mode.

In certain aspects, when operating in in-band or guard-band modes, one resource block of 180 Khz bandwidth is allocated to an NB-IoT system. The LTE channel raster is 100 KHz and the NB-IoT frequency offset for the guard band and in-band modes is $-/+2.5$ KHz or $-/+7.5$ KHz. In an aspect, two NB-IoT systems within an LTE band with carrier frequencies $f_1=100X_1+d_1$ and $f_2=100X_2+d_2$, should satisfy $abs(f_1-f_2)=180M$ for some integer M. Thus, it may be inferred that the minimum possible value of M is 5 which results in at least a 900 KHz frequency separation. Thus, for NB-IoT systems operating in in-band and guard-band modes, the frequency bands need to have a minimum separation 900 KHz. In an aspect, the UE may examine the frequency separations of the frequency bands, and if the frequency separations of a subset of the bands are less than 900 KHz, may determine the operation mode is the standalone mode.

In certain aspects, the UE may detect a synchronization signal (e.g., NPSS, NSSS) on each of a plurality of NB-IoT frequency bands and may determine a frequency separation between at least two consecutive frequency bands based on the detected synchronization signal. The UE may determine the mode of operation based on the determined frequency separation.

In an example technique, the UE may determine frequency separation for two pairs of frequency bands, the two pairs including three frequency bands with one of the three frequency bands common among the two pairs, and determine the NB-IoT mode based on the frequency separation for both the pairs of frequency bands. For example, in the initial acquisition/frequency scan procedure, the UE detects three frequency bands with center frequencies of $f_1<f_2<f_3$ such that $(f_2-f_1)<900$ KHz and $(f_3-f_2)<900$ KHz, and based on this detection determines that the NB-IoT mode is the standalone mode.

In certain aspects, if the UE determines that the NB-IoT mode is not the in-band mode, the UE may assume that NRS is transmitted based on standalone or guard-band configuration, and may use this information to receive NRS. For example, the UE may use the NRS pattern based on standalone or guard-band configuration to receive NRS. In an aspect, the UE may use the received NRS for channel estimation, and receive and process NPBCH based on the estimated channel.

In certain aspects, if the UE determines that the NB-IoT mode is the standalone mode, the UE may assume that there is no raster frequency offset, and may use this information to receive samples of NPBCH and other reference signals.

In certain aspects, if the UE determines that the NB-IoT mode is the standalone mode, the UE may assume that there is no raster frequency offset, and may use this information to receive samples on other frequency bands. For example, the determination that there is no frequency offset may be used to adjust time and/or frequency for receiving samples and searching for NPSS/NSSS on other frequency bands.

In certain aspects, additionally or alternatively, the determination of the NB-IoT mode may further be based on the measured received signal power or quality (e.g., Reference Signal Received Power (RSRP) and/or Reference Signal Received Quality (RSRQ)) of the NB-IoT synchronization signals, for example, as measured at a UE. For example, the determination of the NB-IoT mode based on the above discussed techniques is valid and may be used for receiving signals only if RSRP and/or RSRQ of NB-IoT synchronization signals is greater than a threshold.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for processing, means for extracting, means for correlating, and/or means for using may comprise one or more processors, such as the controller/processor 480 of the user equipment 120 and/or the controller/processor 440 of the base station 110.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
   determining a mode of operation of a network supporting Narrowband Internet of Things (NB-IoT), based on at least one synchronization signal received at the UE, wherein the mode of operation indicates what bandwidth resources are used in the network, wherein the determining the mode of operation comprises:
      determining whether resources used for transmitting the at least one synchronization signal are punctured, comprising:
         extracting the at least one synchronization signal from a signal received on a NB-IoT frequency band;
         correlating the extracted signal with each of a plurality of candidate resource patterns including a non-punctured resource pattern and at least one punctured resource pattern, wherein each candidate punctured resource pattern corresponds to a different combination of at least a Narrowband Cell Identifier (NCell id) and a number of CRS (Cell-Specific Reference Signal) ports; and
         determining whether the resources used for transmitting the at least one synchronization signal are punctured based on a result of the correlation; and
      determining the mode of operation based at least in part on the determination of whether the resources are punctured; and
   processing signals based on the determined mode of operation.

2. The method of claim 1, wherein the mode of operation is determined before decoding a broadcast channel which indicates the mode of operation.

3. The method of claim 1, further comprising:
   determining that the mode of operation is an in-band mode of operation, if the resources are punctured; and determining that the mode of operation is at least one of standalone mode of operation or guard-band mode of operation, if the resources are not punctured.

4. The method of claim 1, wherein the result of the correlation includes a candidate resource pattern having a highest correlation metric as a result of the correlation.

5. The method of claim 1, further comprising:
if the result of the correlation includes a punctured resource pattern, determining a number of CRS ports corresponding to the punctured resource pattern as the number of CRS ports used for transmitting the signal.

6. The method of claim 1, wherein determining the mode of operation comprises:
detecting a synchronization signal on each of a plurality of NB-IoT frequency bands;
determining a frequency separation between at least two frequency bands of the plurality of NB-IoT frequency bands, based on the detected synchronization signal; and
determining the mode of operation based on the determined frequency separation.

7. The method of claim 6, wherein determining the mode of operation based on the determined frequency separation includes:
determining that the mode of operation is a standalone mode of operation, if the frequency separation is less than a frequency separation threshold.

8. The method of claim 7, wherein the frequency separation threshold is 900 KHz.

9. The method of claim 6, wherein the frequency separation is determined for two pairs of frequency bands, the two pairs including three frequency bands with one of the three frequency bands common among the two pairs.

10. The method of claim 9, wherein determining the mode of operation based on the determined frequency separation includes:
determining that the mode of operation is a standalone mode of operation, if the frequency separation for both the pairs of frequency bands is less than a frequency separation threshold.

11. The method of claim 6, wherein the frequency separation includes a frequency separation between center frequencies of the at least two frequency bands.

12. The method of claim 1, wherein processing the signals comprises:
if the mode of operation is determined as standalone mode of operation, assuming that a raster frequency offset for frequency bands in the network is zero; and
receiving the signals based on the assumption.

13. The method of claim 1, wherein processing the signals comprises:
if the mode of operation is determined as standalone mode of operation, assuming that a raster frequency offset for frequency bands in the network is zero;
adjusting at least one of time or frequency for receiving signals on one or more frequency bands; and
receiving signals on the one or more frequency bands based on the adjustment.

14. The method of claim 1, wherein processing the signals comprises:
if it is determined that the mode of operation is not in-band mode of operation, using configuration of at least one of standalone mode of operation or guard-band mode of operation to receive Narrowband Reference Signals (NRS).

15. The method of claim 1, wherein processing the signals comprises:

determining a Narrowband Reference Signal (NRS) pattern based on the determination of the mode of operation; and
using the determined NRS pattern to receive NRS.

16. The method of claim 15, wherein NRS is used for channel estimation, and wherein the processing the signals includes processing Narrowband Physical Broadcast Channel (NPBCH) based on the channel estimation.

17. The method of claim 1, further comprising:
deciding to use the determined mode of operation for the processing the signals if a received signal quality of at least one received signal is above a threshold quality.

18. The method of claim 1, wherein the at least one synchronization signal includes Narrow-band Primary Synchronization Signal (NPSS) or Narrow-band Secondary Synchronization Signal (NSSS).

19. The method of claim 1, wherein determining whether resources used for transmitting the at least one synchronization signal are punctured comprises determining whether the resources used for transmitting the at least one synchronization signal are punctured on at least a subset of the resources that overlap with resources used for transmission of Cell-Specific Reference Signals (CRS).

20. An apparatus for wireless communication by a User Equipment (UE), comprising:
means for determining a mode of operation of a network supporting Narrowband Internet of Things (NB-IoT), based on at least one synchronization signal received at the UE, wherein the mode of operation indicates what bandwidth resources are used in the network, wherein the means for determining the mode of operation comprises:
means for determining whether resources used for transmitting the at least one synchronization signal are punctured, wherein the means for determining determines whether the resources used for transmitting the at least one synchronization signal are punctured by:
extracting the at least one synchronization signal from a signal received on a NB-IoT frequency band;
correlating the extracted signal with each of a plurality of candidate resource patterns including a non-punctured resource pattern and at least one punctured resource pattern, wherein each candidate punctured resource pattern corresponds to a different combination of at least a Narrowband Cell Identifier (NCell id) and a number of CRS (Cell-Specific Reference Signal) ports; and
determining whether the resources used for transmitting the at least one synchronization signal are punctured based on a result of the correlation; and
means for determining the mode of operation based at least in part on the determination of whether the resources are punctured; and
means for processing signals based on the determined mode of operation.

21. The apparatus of claim 20, wherein the mode of operation is determined before decoding a broadcast channel which indicates the mode of operation.

22. An apparatus for wireless communication by a User Equipment (UE), comprising:
at least one processor; and
memory coupled to the at least one processor, the memory comprising code executable by the at least one processor to cause the UE to:

determine a mode of operation of a network supporting Narrowband Internet of Things (NB-IoT), based on at least one synchronization signal received at the UE, wherein the mode of operation indicates what bandwidth resources are used in the network, wherein determining the mode of operation comprises:
    determining whether resources used for transmitting the at least one synchronization signal are punctured, comprising:
        extracting the at least one synchronization signal from a signal received on a NB-IoT frequency band;
        correlating the extracted signal with each of a plurality of candidate resource patterns including a non-punctured resource pattern and at least one punctured resource pattern, wherein each candidate punctured resource pattern corresponds to a different combination of at least a Narrowband Cell Identifier (NCell id) and a number of CRS (Cell-Specific Reference Signal) ports; and
        determining whether the resources used for transmitting the at least one synchronization signal are punctured based on a result of the correlation; and
    determining the mode of operation based at least in part on the determination of whether the resources are punctured; and
process signals based on the determined mode of operation.

23. The apparatus of claim 22, wherein the mode of operation is determined before decoding a broadcast channel which indicates the mode of operation.

24. A non-transitory computer-readable medium for wireless communication by a User Equipment (UE), the computer-readable medium storing instructions which when processed by at least one processor causes the UE to:
    determine a mode of operation of a network supporting Narrowband Internet of Things (NB-IoT), based on at least one synchronization signal received at the UE, wherein the mode of operation indicates what bandwidth resources are used in the network, wherein the determining the mode of operation comprises:
        determining whether resources used for transmitting the at least one synchronization signal are punctured, comprising:
            extracting the at least one synchronization signal from a signal received on a NB-IoT frequency band;
            correlating the extracted signal with each of a plurality of candidate resource patterns including a non-punctured resource pattern and at least one punctured resource pattern, wherein each candidate punctured resource pattern corresponds to a different combination of at least a Narrowband Cell Identifier (NCell id) and a number of CRS (Cell-Specific Reference Signal) ports; and
            determining whether the resources used for transmitting the at least one synchronization signal are punctured based on a result of the correlation; and
        determining the mode of operation based at least in part on the determination of whether the resources are punctured; and
process signals based on the determined mode of operation.

25. The computer-readable medium of claim 24, wherein the mode of operation is determined before decoding a broadcast channel which indicates the mode of operation.

* * * * *